United States Patent [19]

Grover

[11] 4,180,107
[45] Dec. 25, 1979

[54] STUMP ERADICATOR

[75] Inventor: Ross D. Grover, Crystal, Mich.

[73] Assignee: Ram Industries, Inc., Northville, Mich.

[21] Appl. No.: 815,723

[22] Filed: Jul. 14, 1977

Related U.S. Application Data

[63] Continuation-in-part of Ser. No. 585,459, Jun. 10, 1975, Pat. No. 4,041,996.

[51] Int. Cl.² ............................................. B27C 9/00
[52] U.S. Cl. ................................. 144/2 N; 144/42; 144/218; 144/236; 144/237; 144/326 R; 241/292.1
[58] Field of Search .............. 144/2 N, 167 R, 172, 144/176, 218, 42, 43, 44, 221, 236, 237, 241, 322, 323, 326 R, 326 A, 326 B, 326 C; 241/292.1

[56] References Cited

U.S. PATENT DOCUMENTS

| 201,938 | 4/1878 | Nickerson | 144/237 |
|---|---|---|---|
| 479,332 | 7/1892 | Patten | 144/42 |
| 768,234 | 8/1904 | Miles | 144/241 |
| 964,602 | 7/1910 | Aldridge | 144/236 X |
| 2,876,811 | 3/1959 | Matthews | 144/42 X |
| 2,976,688 | 1/1957 | Clark | 144/42 X |
| 2,997,082 | 8/1961 | Schubert et al. | 144/42 X |
| 3,025,895 | 3/1962 | Girard | 144/326 C |
| 3,032,084 | 5/1962 | Traben | 144/326 C |
| 3,162,222 | 12/1964 | Kirsten | 144/326 C |
| 3,336,958 | 8/1967 | Carlton | 144/2 N |
| 3,389,726 | 6/1968 | Good | 144/2 N |
| 3,845,796 | 11/1974 | Moore | 144/2 N |
| 3,868,980 | 3/1975 | Blum | 144/2 N |

FOREIGN PATENT DOCUMENTS

| 996007 | 11/1974 | Canada | 144/2 N |
|---|---|---|---|
| 1139679 | 1/1969 | United Kingdom | 144/2 N |

Primary Examiner—R. L. Spruill
Assistant Examiner—W. D. Bray
Attorney, Agent, or Firm—Whittemore, Hulbert & Belknap

[57] ABSTRACT

Apparatus for eradicating tree stumps comprising a rotary cylinder or drum having knives or teeth around its periphery. The teeth include both cutter teeth and chipper teeth. The primary purpose of the chipper teeth is to hog out and remove the fibrous wood material. The primary purpose of the cutter teeth is to break up and cut or slit the fibers so that they may be more easily hogged out by the chipper teeth.

7 Claims, 9 Drawing Figures

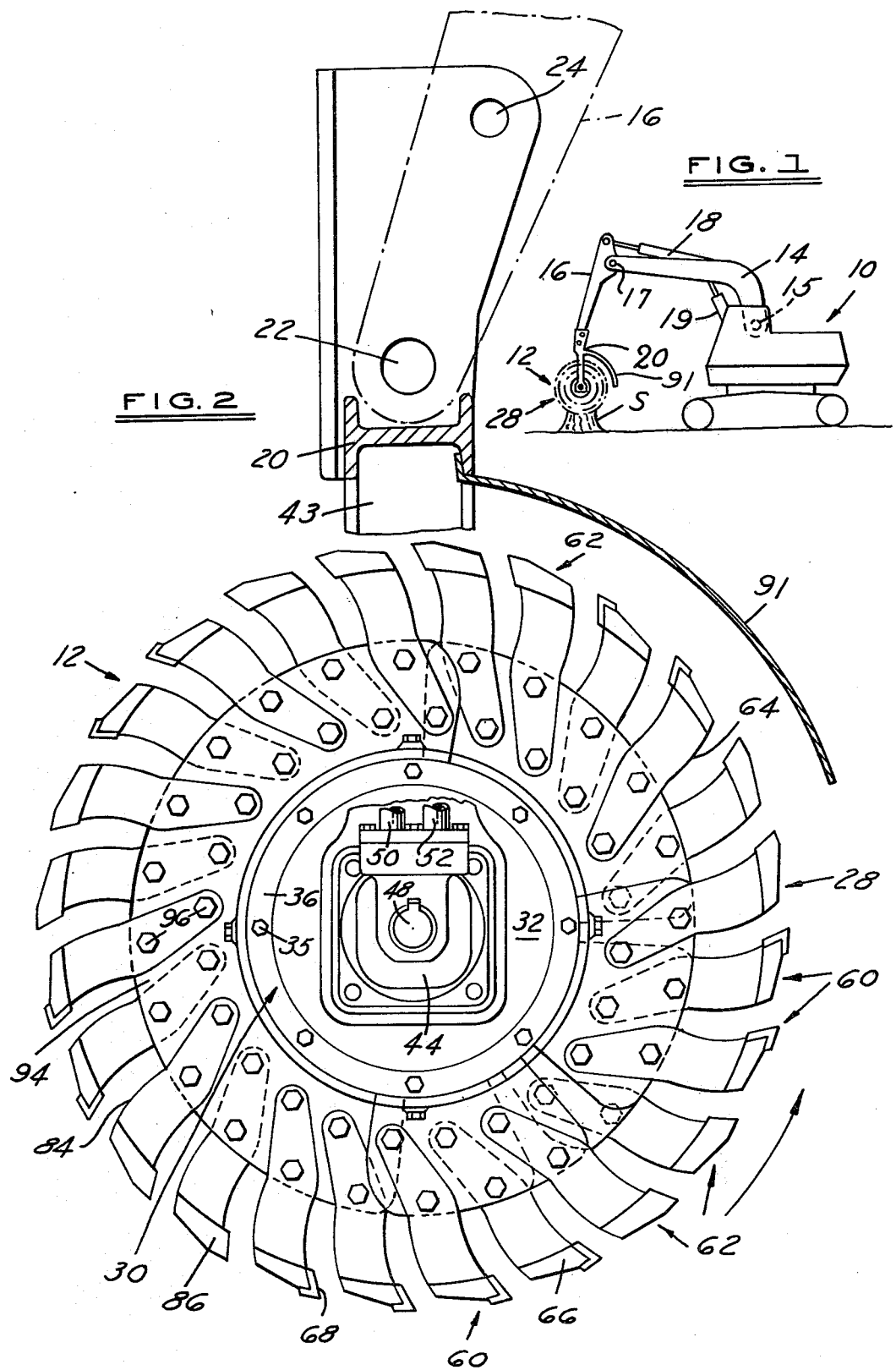

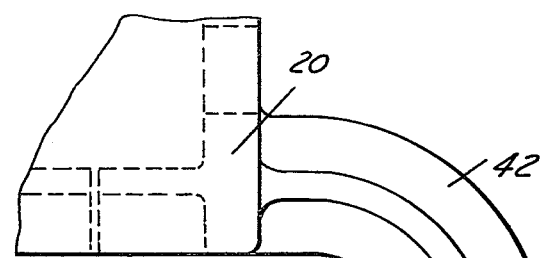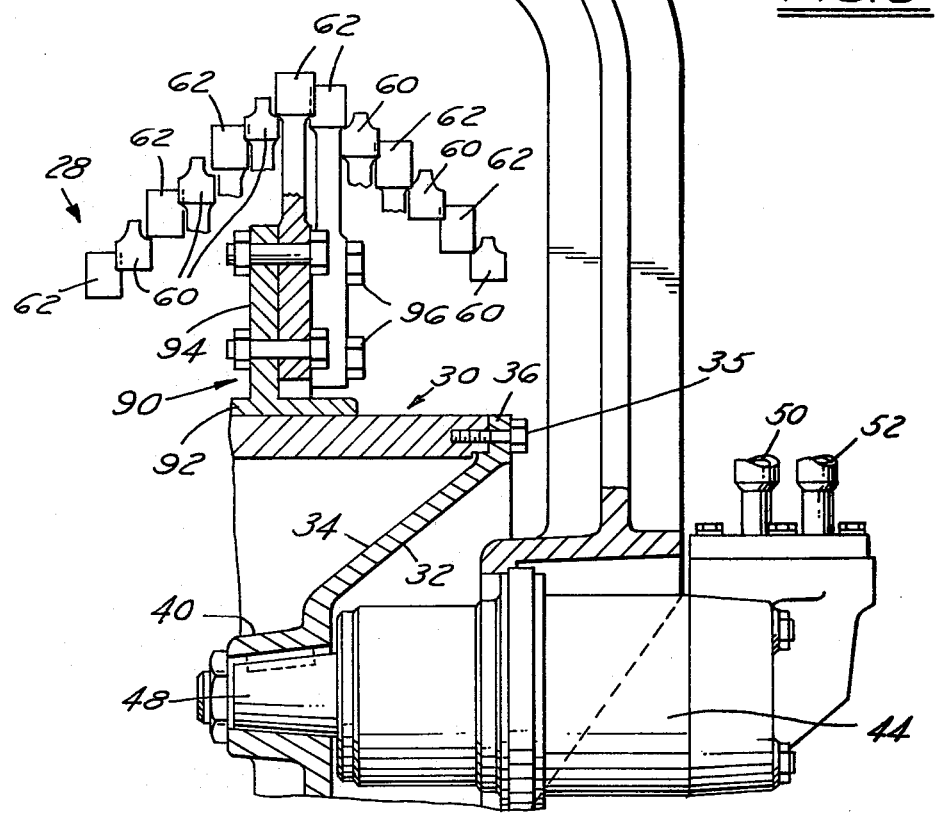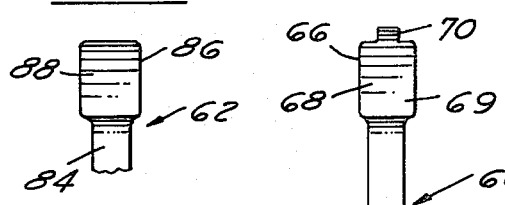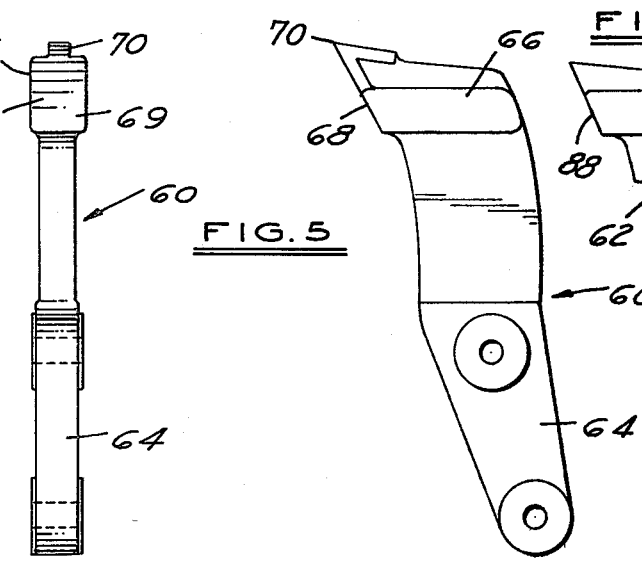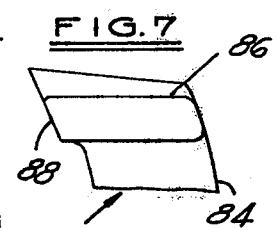

STUMP ERADICATOR

REFERENCE TO RELATED APPLICATION

This application is a continuation-in-part of my copending U.S. application Ser. No. 585,459 filed June 10, 1975, now U.S. Pat. No. 4,041,996.

SUMMARY OF THE INVENTION

This invention has for a principal object to provide an improved apparatus for clearing tree stumps by cutting or pulverizing them down to a level below the surface of the ground. The apparatus may also be used to clear a field of small trees, roots and underbrush existing at or near ground level.

Another object of the invention is to provide an improved construction and arrangement of teeth for more effective cutting and pulverizing action.

In accordance with the specific embodiment of the invention about to be described, the teeth include both chipper and cutter teeth. The primary purpose of the chipper teeth is to hog out the fibrous wood material and the primary purpose of the cutter teeth is to cut or slit and break the wood fibers so that they may be more readily hogged out by the chipper teeth.

Other objects and features of the invention will become more apparent as this description proceeds, especially when taken in conjunction with the accompanying drawings wherein:

FIG. 1 is a semi-diagrammatic side elevational view on a reduced scale showing the stump eradicating apparatus of my invention mounted upon a typical vehicle suitable for this purpose.

FIG. 2 is a side elevational view of a portion of the apparatus of FIG. 1, showing the same on an enlarged scale.

FIG. 3 is a partial front elevation of the structure shown in FIG. 2 with parts broken away and in section along the line 3—3 in FIG. 9.

FIG. 4 is a front elevational view of a cutter tooth.

FIG. 5 is a side elevational view of the cutter tooth.

FIG. 6 is a fragmentary front elevational view of a chipper tooth.

FIG. 7 is a fragmentary side elevational view of the chipper tooth.

Figure 8:
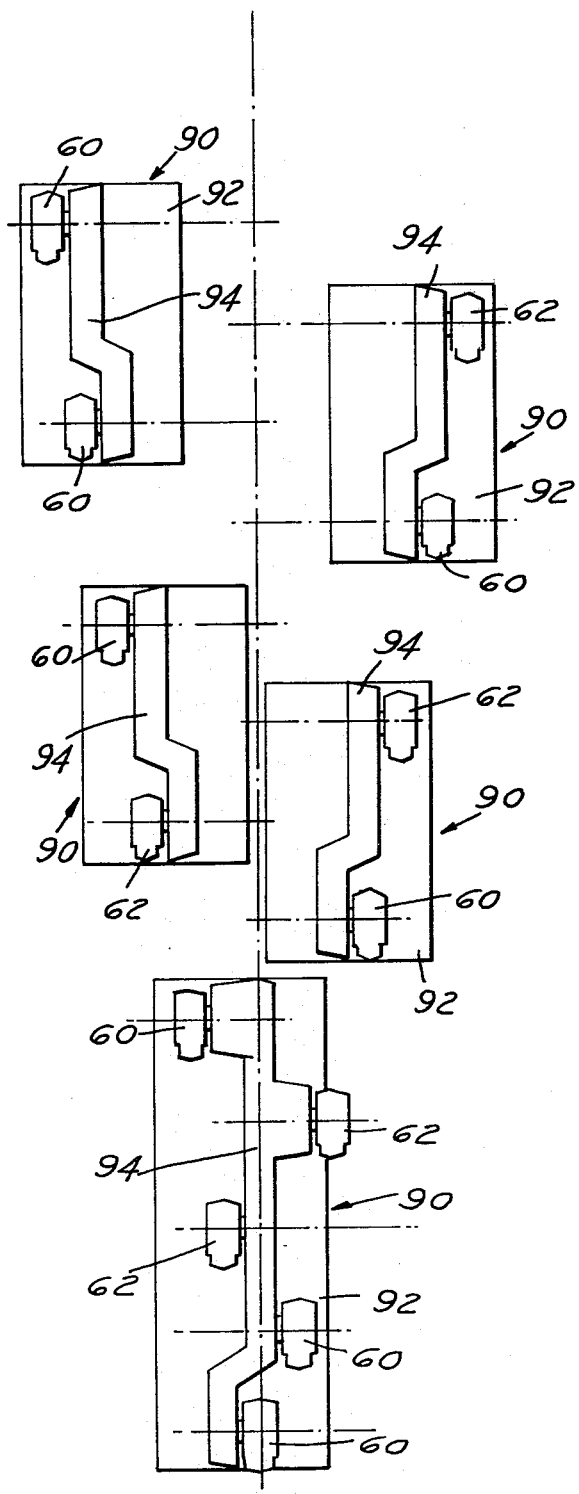
FIG. 8 is a development showing the arrangement of one of the groups of teeth on the periphery of the drum.

Referring now more particularly to the drawings, there is shown a typical motor vehicle, in this instance a caterpiller type tracter 10 with electric, hydraulic or air pressure capacity, upon which the stump eradicating apparatus 12 of this invention is mounted. A wheeled vehicle or trailer may be used instead of a tractor. The tractor 10 has a boom 14 which may be raised and lowered about pivot 15 by cylinder assembly 19. An arm 16 is pivoted at 17 to boom 14 for fore and aft movement by the cylinder assembly 18. The apparatus 12 includes a supporting yoke 20 which is secured to the lower end of the arm 16 by pins 22 and 24. The apparatus 12 is easily mounted on the arm 16 which is part of the original vehicle 10 without machining any parts, only adding on. The mounting of the stump eradicating apparatus 12 on the vehicle 10 makes the apparatus portable and capable of being self-propelled or moved to any accessible location in a field where a stump S is to be cleared.

The stump eradicating apparatus 12 includes in addition to the yoke 20 a cylindrical cutting assembly 28. The cutting assembly 28 has a hollow cylinder or drum 30 (FIG. 3) which is of uniform circular cross section throughout its length and in the present instance is open ended. The ends of the drum 30 are closed by the frusto-conical or recessed end caps 32. Only one of such end caps is shown in FIG. 3 but it will be understood that the opposite end of the drum may be closed by a similar member. The end caps 32 have a frusto-conical section 34 which extends into the drum and a laterally outwardly extending flange 36 at the large end which is bolted to the end of drum 30 by fasteners 35. Each end cap has a tubular extension 40 at the small end of the frusto-conical section which is aligned with the axis of the drum 30.

The yoke 20 for supporting the cutting assembly 28 has a pair of yoke arms 42 and 43 which straddle the drum. A rotary motor 44 is rigidly secured to the end of the yoke arm 42. In this instance the motor is a hydraulic motor but it could be air operated or electric. The output shaft 48 of the motor projects into the tubular cap extension 40 and is keyed thereto as shown. Hydraulic lines 50 and 52 carry operating fluid to and from the motor to rotate the drum. No special power system is ordinarily required to operate the motor since the one provided on the vehicle or tractor may be used. In fact, it is preferred to make use of the system on the tractor for this purpose.

A reversing valve, not shown, may be provided in the hydraulic lines 50 and 52 so that the motor may be operated to drive the drum in either direction. Normal rotation is in the direction of the arrow in FIG. 2.

A second motor may be secured to the other arm 43 of the yoke and keyed to the end cap at the opposite end of the drum so that the drum will be driven by two motors instead of one. One motor however is sufficient for the purpose. If only one motor is employed, then a simple bearing connection between the opposite end of the drum and yoke arm 43 may be employed.

The cutting assembly 28 is provided with a plurality of knives or teeth distributed over the peripheral surface of the drum to do the actual cutting and pulverizing and hogging of the tree stump material. The knives include both cutter teeth 60 and chipper teeth 62. The main purpose of the cutter teeth is to slit or cut and break up the wood fibers of the stump while the main purpose of the chipper teeth is to hog out or remove the stump material. The hogging out and removal of the stump material by the chipper teeth is accomplished more readily because of the breaking up and slitting of the stump material by the cutter teeth.

One of the cutter teeth 60 is shown in FIGS. 4 and 5. As there shown, each cutter tooth has a shank portion 64 and a head 66. The cutting face of the head 66 is indicated at 68. The principal cutting action by the face 68 of the cutting head 66 is accomplished by the narrow radially outwardly projecting portion 70. Actually, depending on the depth of cut, the wider rectangular portion of face 68, designated 69, may also cut and even hog out stump material. This cutting face 68 as well as the narrow portion 70 thereof is a planar surface which extends generally radially outwardly towards its tip but is inclined at a slight angle forwardly or in the direction of intended rotation shown by the arrow in FIG. 2. The cutting face 68 lies in a plane parallel to the drum axis.

The relatively narrow portion 70 of the cutting head may vary in width but in the present instance is ⅜". The wider portion of the cutting face 68 may also vary but in the present instance is 1". The relatively narrow portion 70 digs down into the wood fibers of the stump to cut and break the fibers.

The chipper teeth are of the construction shown in FIGS. 6 and 7. The shank portions 84 of the chipper teeth 62 are of the same construction as the shank portions of the cutter teeth. However, the heads 86 of the chipper teeth are different than the heads of the cutter teeth. The chipping face 88 of the head 86 is a planar surface which, like the cutting face 68 of the cutter tooth 60, extends generally radially towards its tip but is inclined at a slight angle forwardly or in the direction of intended rotation indicated by the arrow in FIG. 2. Chipping face 88 lies in a plane parallel to the drum axis. The chipping face 88 is of the same rectangular size and shape as the portion 69 of the cutting face 68 of the cutter tooth. The cutter tooth is actually the same as the chipper tooth with the narrow projecting portion 70 added. The actual width of the chipping face may vary but in the present instance is 1". It will also be noted from a comparison of FIGS. 4-7 that the portions 69 of the cutting faces of the cutter teeth project radially outwardly from the drum axis the same distance as the chipping faces of the chipper teeth, but that the portions 70 of the cutting faces of the cutting teeth project still farther outward by an amount in the present instance of ⅜". The radially inner edges of the cutting faces 68 and chipping faces 88 are located the same distance from the drum axis.

The teeth are distributed over the peripheral face of the drum in generally V-shaped groups. The groups A and B of teeth are arranged over an area between one end of the drum and the middle of the drum, the middle being determined by a central plane half way between the drum ends and extending at right angles to the drum axis. The remaining surface area of the drum between the central plane and its opposite end have the two groups of teeth D and C. The V-shaped groups of teeth are each disposed so as to extend circumferentially of the drum with the V pointing in the direction of rotation. Each group of teeth in the present instance extends over 180° of drum surface. While the two groups A and B of the drum do not overlap, but extend over different 180° segments, and while the other two groups C and D likewise do not overlap, (although their extremities coincide at the 180° and 360° points), groups A snd B are staggered 90° with respect to the two groups C and D. This can be seen clearly in the development shown in FIG. 9.

The teeth are arranged in axially spaced sets, a set being defined as a plurality of teeth all of which lie in a common plane perpendicular to the drum axis. In the present instance there are two teeth in each set spaced 180° apart. Thus the two teeth 60a and 62a at the points of the V of groups A and B comprise one set of teeth. The teeth 60b and 62b comprise another set of teeth and the teeth 60c and 62c comprise still another set. This tooth arrangement provides dynamic balance for the drum.

It will be noted that the two teeth in each set include a cutter tooth and a chipper tooth. While the teeth of each set are spaced 180° apart, for purposes of understanding their cooperative action in removing fibrous tree trunk stump material, the cutter tooth should be considered as spaced ahead of the chipper tooth in the direction of rotation for the reason that the cutter tooth is intended to cut and break up the fibrous material which is thereafter hogged out by the chipper tooth.

Figure 9:
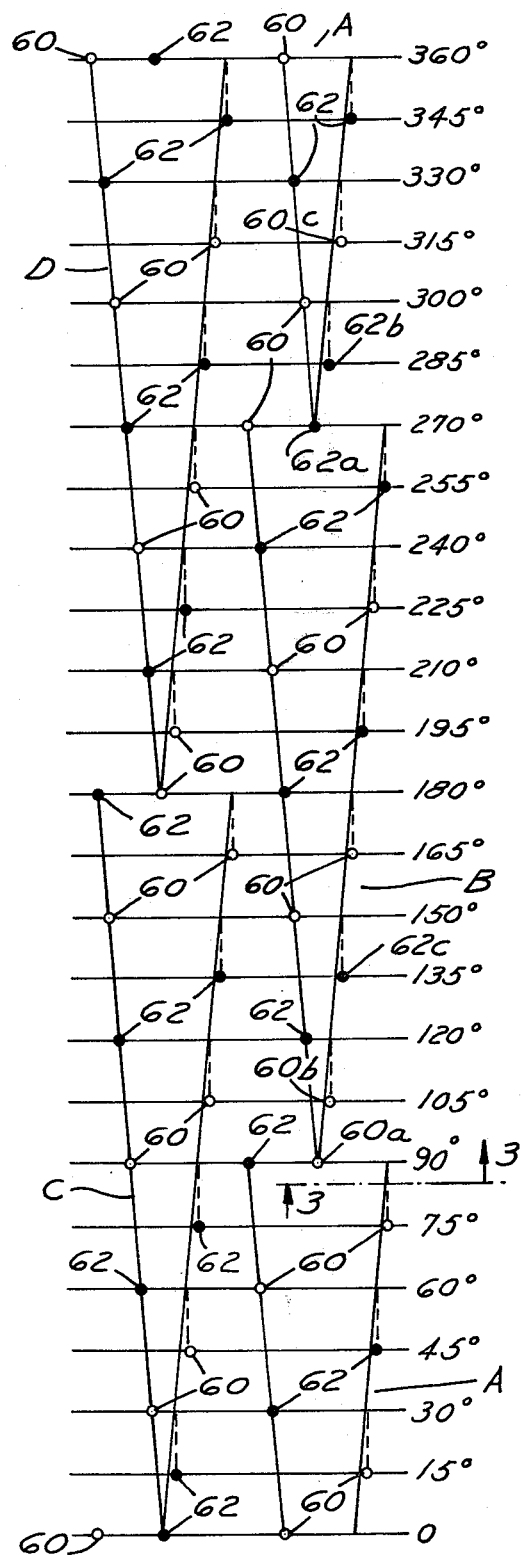
FIG. 9 is a diagrammatic view showing a development of the entire drum periphery, illustrating the complete arrangement of the cutter and chipper teeth.

It will be further noted by reference to FIG. 9 that the teeth across the face of the drum are arranged in axially or laterally spaced pairs, or in some instances in threes. The purpose of this distribution is to balance the load between the ends of the drum for a smoother drum rotation with less wear and tear on the bearings.

A guard 91 secured to yoke 20 extends over a portion of the drum as a shield.

The teeth may be mounted on the drum by any suitable mounting means so that they are disposed in the relationship previously described. FIG. 8 shows in development form the mounting of teeth in one of the V groups by ring segments 90. Each ring segment supports a plurality of the teeth and comprises a base portion 92 secured to the drum periphery. A generally circumferentially extending and radially outwardly projecting mounting portion 94 is formed integral with the base as shown in FIG. 3. Fastening means such as the nut and bolt assemblies 96 individually mount the teeth on the mounting portions.

In use, the vehicle 10 is self-propelled to a position adjacent the spot where the apparatus 12 is to be operated. Motor 44 is driven to rotate the cutting assembly 28 in the direction of the arrow in FIG. 2. The boom 14 is lowered by cylinder 19 to lower the cutting assembly 28. The cutting assembly may be brought down into engagement with the top of the stump and continued downward pressure causes the teeth 60 and 62 to cut away and pulverize the stump down to a level below the surface of the ground. The stump may also be eradicated by bringing the cutting assembly 28 down to near ground level either in front of or behind the stump and then pivoting arm 16 by operation of cylinder 18 to swing the cutting assembly back and forth across the stump. The length of the drum is such that it exceeds the diameter of most tree stumps so that a single pass is all that usually is required. As stated above, the apparatus may also be used to clear a field of roots, etc., and for this purpose may be operated while the vehicle is in motion.

One of the main purposes of the cutting teeth is to cut or slit and break up the wood fibers of the stump. This is accomplished primarily by the narrow projecting portion 70 of the cutter teeth 60. The main function of the chipper teeth 62 is to hog out or remove the fibrous material. The cutting action of the cutter teeth 60 makes the fibrous material of the stump easier to remove by the chipper teeth.

In a broad sense, the cutter and chipper teeth may be randomly distributed, but preferably each cutter tooth is positioned so as to be followed by a chipper tooth during drum rotation. In other words, preferably there is a chipper tooth directly behind each cutter tooth in the same plane as the cutter tooth so that after the stump material is cut and broken up by the cutter tooth it can be hogged out by the chipper tooth. In the illustrated embodiment, each set of teeth operating in the same plane consists of one cutter tooth and one chipper tooth (as for example the teeth 60a, 62a and 60b, 62b). These teeth in each set are 180° apart. Actually, more than two teeth in each set may be provided and the teeth may be alternately cutter teeth and chipper teeth. It is not absolutely necessary that the teeth in each set be alternately cutter and chipper teeth, but it is extremely desirable that each set of teeth in the same plane normal to the drum axis contain at least one cutter tooth and at least one chipper tooth so that as the drum rotates the stump material is both cut and hogged out by the teeth in the same set.

It should be noted that the cutter teeth project radially outwardly a greater distance than the chipper teeth. This is so that the wood fiber will be more deeply cut by the cutter teeth to still further facilitate the hogging action of the chipper teeth.

It will also be noted that the cutting face 68 of the cutter teeth has in addition to the narrow portion 70 a wider portion 69. The narrow portion 70 is primarily for cutting and breaking up fibers and the wider portion 69 will not only cut fibers but also hog out and remove stump material. Thus depending upon the depth of cut, the cutter teeth may hog out as well as cut the stump material. Because of the combined cutting and hogging action of the cutter teeth, the teeth on the periphery of the drum could consist wholly of cutter teeth. However, I believe that a more effective cutting action can be obtained by using both cutter and chipper teeth, the cutter teeth mainly cutting and breaking up the stump material and the chipper teeth mainly hogging out the cut material. Likewise it is desirable that the teeth be arranged in sets containing at least one cutter tooth and at least one chipper tooth in a common plane normal to the axis of rotation so that the cutter tooth in each plane is followed by a chipper tooth which will hog out the cut material.

What I claim as my invention is:

1. Apparatus for eradicating tree stumps and the like comprising an axially rotatable drum, means supporting said drum for rotation and means for rotating said drum, a plurality of cutter teeth on the periphery of said drum adapted to cut wood fiber material, and a plurality of chipper teeth on the periphery of said drum adapted to hog out wood fiber material, both said cutter teeth and said chipper teeth projecting radially outwardly from said drum and having heads at their radially outer extremities, the heads of said teeth having cutting faces facing in the direction of intended drum rotation, the cutting faces of the heads of said cutter teeth having portions which are narrower than and project radially outwardly farther than the cutting faces of said chipper teeth.

2. Apparatus as defined in claim 1, wherein the cutting faces of the heads of said cutter teeth each has a second portion which is wider than said first-mentioned portion and from which said first-mentioned portion projects radially outwardly substantially midway of the width thereof.

3. Apparatus as defined in claim 1, wherein said teeth are arranged on said drum in axially spaced sets, each set comprising at least one chipper tooth and one cutter tooth circumferentially spaced from said chipper tooth forwardly in the direction of intended rotation, whereby the wood fiber material can be more readily hogged out by said chipper teeth after being cut by said cutter teeth.

4. Apparatus as defined in claim 3, wherein said one chipper tooth and said one cutter tooth of each set are spaced 180° apart.

5. Apparatus as defined in claim 1, wherein said teeth are arranged in V-shaped groups, the V-shaped pattern of each group extending from its apex circumferentially of the drum.

6. Apparatus as defined in claim 1, wherein said teeth are arranged in V-shaped groups disposed circumferentially of the drum, said groups being axially spaced from and circumferentially staggered with respect to each other.

7. Apparatus as defined in claim 1, wherein said teeth are arranged in V-shaped groups, the V-shaped pattern of each group extending from its apex circumferentially of the drum, there being at least four groups of teeth, two of which are disposed in a first circumferential alignment and two of which are disposed in a second circumferential alignment axially spaced from said first circumferential alignment, the groups of said first circumferential alignment being staggered with respect to those of the second circumferential alignment.

* * * * *